Patented July 19, 1938

2,124,332

UNITED STATES PATENT OFFICE 2,124,332

PROCESS FOR GRANULATING FERTILIZERS

Frank J. DeRewal, Camillus, N. Y., assignor, by mesne assignments to The Solvay Process Company, New York, N. Y., a corporation of New York No Drawing. Application June 17, 1933, Serial No. 676,331

4 Claims. (Cl. 71—28)

This invention relates to a process for the preparation of granular fertilizers containing ammonium nitrate and calcium carbonate.

It is known to prepare fertilizers by mixing finely divided calcium carbonate with a melt of ammonium nitrate and while the mixture is at a sufficiently high temperature to maintain it in a fluid condition, for example, at a temperature of about 100° C. or higher, to disperse the fluid melt in the form of small drops into air to solidify the melt and to obtain a granular product. The temperature to which the ammonium nitrate-calcium carbonate mixture must be heated in order to maintain it sufficiently fluid to be thus dispersed into a cooling atmosphere to solidify it, depends upon the amount of water in the ammonium nitrate melt as well as upon the proportion of calcium carbonate added. (In this specification and in the claims all quantities of materials are given in parts or percentages by weight unless otherwise stated in specific instances.) Thus, for example, in preparing mixtures containing about 40 parts of calcium carbonate and 60 parts of ammonium nitrate, if the ammonium nitrate melt to which the calcium carbonate is added contains 90% to 95% ammonium nitrate and 10% to 5% water, for example, the mixture is sufficiently fluid for dispersion at temperatures ranging from about 100° C. to 120° C.

In order to obtain a satisfactorily dry product employing materials containing these proportions of water, however, it has been found necessary to subject the solidified granular material to a prolonged drying operation. If, to avoid this prolonged drying step, ammonium nitrate melts containing more than 95% ammonium nitrate are employed, the mixture must be heated to relatively high temperatures above about 120° C. in order that it may be sufficiently fluid to be satisfactorily dispersed in the form of drops. These high temperatures, however, are disadvantageous since they tend to cause a reaction to take place between the calcium carbonate and ammonium nitrate, liberating ammonia from the ammonium nitrate and forming products which give the material undesirable characteristics, particularly with respect to its hygroscopicity and caking during storage.

It is an object of this invention to provide a process for the preparation of granular fertilizers containing materials of the type of ammonium nitrate, urea or calcium nitrate, which are readily fused, particularly in the presence of a small amount of water, and especially for the preparation of granular ammonium nitrate-calcium carbonate fertilizers of a desirable character with respect to its being relatively non-hygroscopic and being capable of storage for relatively long periods of time without undue caking. It is a further object of this invention to provide a process for the economical production of such granular fertilizer products employing ammonium nitrate melts containing but a small proportion of water without necessitating heating mixtures of ammonium nitrate and calcium carbonate to high temperatures with the attendant decomposition.

In granulating a fertilizer material in accordance with the process of this invention, the material at a temperature at which a portion of it is in the liquid phase forming a plastic mass, is forced through orifices to obtain granules which are substantially non-coherent and thus may be cooled and, if desired, dried, to obtain a desired granular product.

In preparing an ammonium nitrate-calcium carbonate fertilizer in accordance with this invention, a melt of ammonium nitrate is mixed with finely divided calcium carbonate, the ammonium nitrate and calcium carbonate being present in amount sufficient to form a plastic mass at an elevated temperature. This mixture, while in the plastic condition such that not more than about 35% by volume, and preferably about 20% to 35% by volume, of the mass is in the liquid phase, is then comminuted by forcing it through restricted orifices as, for example, by pressing the plastic mass through a screen or grid. I have discovered that when hot fluid ammonium nitrate-limestone mixtures containing a small quantity of water are cooled, a plastic condition occurs and persists over a range of about 20° C. While in this condition the material has somewhat the consistency of putty, although more crumbly, and thus may be readily forced through orifices and, when thus comminuted, the granules obtained are of sufficient strength and are substantially non-coherent so that they may be handled in a cooler or drier without undue crumbling or powdering or sticking together of the granules. The temperature and moisture content of the material are the chief regulating factors with respect to the formation of the desired plastic mass. With increasing moisture content, the temperatures at which this plastic mass forms are decreased and thus the temperatures at which the mass may be forced through the screen or grid are lowered. The following table shows the approximate relation between the water content of a mixture of 60 parts by weight of ammonium nitrate and 40 parts by weight of calcium carbonate and the upper range of temperatures at which the mixture is in a suitably plastic condition for granulating in accordance with this invention. The last column of this table shows the concentration of an ammonium nitrate melt suitable for mixing with dry finely divided calcium carbonate to obtain mixtures containing the proportions of water shown in the first column of the table.

| Percent water in mixture | Comminuting temperature, degrees centigrade | Percent $NH_4NO_3$ in melt |
| --- | --- | --- |
| 1.8 | 100–110 | 97 |
| 2.4 | 90–100 | 96 |
| 3.0 | 75–85 | 95 |
| 3.6 | 65–75 | 94 |
| 6.2 | 30–40 | 90 |

While the temperatures in column 2 above are the preferred temperatures at which the indicated mixtures are comminuted, these temperatures may be lowered somewhat so long as they are not decreased below the range at which the mixture remains plastic. Since the expenditure for energy in forcing the mixtures through a screen or grid increases as the temperature is decreased, it is preferred in carrying out the process of this invention to comminute the mixtures of ammonium nitrate and calcium carbonate containing varying proportions of water at the temperatures indicated in the above table. Furthermore, while fertilizers may be prepared in accordance with the process of this invention employing mixtures containing somewhat more water than is shown in the above table, for example, a mixture containing about 56% $NH_4NO_3$, 38% limestone and 6% water such as may be prepared from a 90% ammonium nitrate melt, it is preferred to employ a molten ammonium nitrate containing about 6 to 3 parts of water to every 94 to 97 parts of ammonium nitrate, which is the range of ammonium nitrate to water in the melts shown in column 3 of the table above and to granulate mixtures of these melts with calcium carbonate at temperatures within the ranges indicated in column 2 of the table. Under such conditions the material when granulated contains a portion in the liquid phase amounting to about 20% to 35% by volume of the total mass.

The following examples are illustrative of the preparation of granulated ammonium nitrate-calcium carbonate fertilizers in accordance with the process of this invention.

*Example I.*—A solution of ammonium nitrate is concentrated until it contains about 96 parts ammonium nitrate and 4 parts of water. It is then cooled to about 100° C. at which point about 55 parts of the nitrate have crystallized. To this slurry, containing finely divided crystalline ammonium nitrate, are added about 63 parts of finely ground limestone at atmospheric temperature. Provision is made to assure uniform mixing. Under substantially adiabatic conditions, the mixture comes to a temperature of about 90° C., at which point about 30% by volume of the mixture is in the liquid phase. The plastic mass of finely divided solid and liquid which is thus formed is forced by a suitable mechanism through a screen having square openings of about 0.15 inch on a side. At this stage, the granular product contains about 2.5% moisture. It is then dried under suitable conditions, for example, in a rotary drum drier countercurrent to a flow of hot air introduced at a temperature of, for example, about 110° to 120° C. If desired, a small quantity (say 2 to 10%) of finely ground limestone may be added to this mixture during, prior to and/or after the drying, thus providing a coating of the granules with limestone and improving the storage properties of the product. The dried product may be screened to remove any fines which may be returned and reworked with additional quantities of fresh $NH_4NO_3$-$CaCO_3$ mixture.

By suitable provision for uniform stirring and mixing where slurries or wet mixtures are being handled, and by use of proportioning equipment, this process can readily be operated on a continuous basis.

*Example II.*—The final stage evaporator in a plant producing $NH_4NO_3$ by a continuous process is operated to yield a hot solution containing about 94% $NH_4NO_3$ and 6% water. This solution is introduced at a temperature of about 125° C. (precooling it if necessary) to a mixer to which is also added finely ground limestone at atmospheric temperature in such proportions as to form continuously a slurry containing approximately equal proportions of finely divided ammonium nitrate and limestone and about 3% water. The temperature of the relatively fluid slurry at this stage is about 110° C., at which point the amount of crystallized $NH_4NO_3$ corresponds to about 6% of the total slurry weight.

The slurry is fed from the mixer to a steam jacketed pan where it is maintained at about 110° C. and stirred to prevent settling. A cooled rotating drum mounted so as to dip into the slurry in the pan is operated under such conditions as to cause the slurry partially to solidify on the drum surface in a layer about 0.1 inch (2.5 mm.) thick and to cool to about 70° C. at the point of removal from the drum surface by a suitable scraper device. The material is readily removed from the drum surface in the form of a continuous plastic sheet in which about 25% by volume of the plastic material is in the liquid phase. It is then cut or broken into suitable lengths, conveyed to a suitable granulation machine and finished as in Example I.

The method of this invention heretofore described in connection with the preparation of ammonium nitrate-calcium carbonate fertilizers is also applicable to the preparation of granulated mixed fertilizers other than those referred to above, and to fertilizers containing but a single material. For example, in place of the limestone of the above mixtures another insoluble relatively infusible solid, such as phosphate rock, may be mixed with the ammonium nitrate. The limestone may be a high calcic limestone or a dolomitic limestone. Also, mixed fertilizers may be prepared by the methods described, containing fusible fertilizer materials such as urea and calcium nitrate in place of the ammonium nitrate.

The process of this invention is also applicable to the granulation of single materials of the type of ammonium nitrate, urea and calcium nitrate, which are highly soluble in water and have a large temperature coefficient of solubility. The following example is illustrative of the granulation of such a material.

*Example III.*—Technically pure ammonium nitrate may be granulated according to this process in the following manner. An aqueous solution of ammonium nitrate is concentrated to a moisture content of about 4%, and is then cooled in a suitable manner to about 60° C. Provision is made to assure formation of a uniform thick slurry of the crystallized finely divided ammonium nitrate and molten ammonium nitrate, either by cooling rapidly in thin sheets, or by using an adequate mixing device. At this stage, about 25% by volume of the mixture is in the liquid phase as a saturated ammonium nitrate solution. The plastic mixture is then granulated by forcing it through a grid having openings about 0.1 inch square in cross-section. The product is then dried in any suitable manner.

As noted above, mixtures of ammonium nitrate and calcium carbonate containing a relatively small proportion of water, may be prepared and granulated without the mixtures being heated to an excessively high temperature in order to make them sufficiently fluid to be dispersed into a cooling gas. The process of this invention by providing a method for granulating fertilizer materials containing but small amounts of water also decreases the extent of drying the granulated material, which is advantageous both with respect to the economical production of a granular fertilizer and to the character of the granular product obtained. But even in those cases where more than the preferred proportions of water as set forth above are present in the material to be granulated, I have found that by employing the process of this invention the resulting product has superior storage properties to the material granulated by the methods heretofore used, which involve the dispersion into a cooling gas of a fluid melt. Further, one of the important factors affecting the storage properties and utility of granulated ammonium nitrate, ammonium nitrate-calcium carbonate mixtures and the like, is granule size. In order to provide large granules by pebbling, it is necessary to allow considerable cooling time to freeze the dispersed slurry in air. This leads to a large process building which adds significantly to cost of the product. The process of this invention for the granulation of fertilizers by forcing a plastic mass through orifices, permits substantial reduction of this item of expense of preparing commercial fertilizer products.

I claim:

1. The process for the production of a granular fertilizer comprising a material selected from the group consisting of ammonium nitrate and urea which comprises forming at an elevated temperature a uniformly plastic mass of said fertilizer having a portion only of said material from the group consisting of ammonium nitrate and urea fused in amount such that about 20% to about 35% by volume of said plastic mass is in the liquid phase, said uniformly plastic mass having a water content regulated between 1.8% and 10%, and then forcing the plastic mass under relatively low pressure through a restricted opening whereby, by reason of the correlation of water content and ratio of liquid phase to solid the extrusion of the material through the opening is possible without rigid control of temperature while at the same time a non-coherent granule is formed having sufficient mechanical strength to be handled without undue crumbling, and then cooling the resulting granules.

2. The process for the production of a granular fertilizer containing a finely divided substantially infusible material and a material selected from the group consisting of ammonium nitrate and urea which comprises forming at an elevated temperature a uniformly plastic mass of a mixture of said infusible material and said material from the group consisting of ammonium nitrate and urea having a portion only of said material from the group consisting of ammonium nitrate and urea fused in amount such that about 20% to about 35% by volume of said plastic mass is in the liquid phase, said uniformly plastic mass having a water content regulated between about 1.8% and about 10% water, and then forcing the plastic mass under relatively low pressure through a restricted opening whereby, by reason of the correlation of water content and ratio of liquid phase to solid the extrusion of the material through the opening is possible without rigid control of temperature while at the same time a non-coherent granule is formed having sufficient mechanical strength to be handled without undue crumbling, and then cooling the resulting granules.

3. The process for the production of a granular fertilizer containing limestone and a material selected from the group consisting of ammonium nitrate and urea which comprises forming a uniformly plastic mass of a mixture of said finely divided limestone and said material from the group consisting of ammonium nitrate and urea at an elevated temperature having a portion only of said material (from the group consisting of ammonium nitrate and urea) fused in amount such that about 20% to about 35% by volume of said plastic mass is in the liquid phase, said uniformly plastic mass having a water content regulated between about 1.8% and about 10% water, and then forcing the plastic mass under relatively low pressure through a restricted opening whereby, by reason of the correlation of water content and ratio of liquid phase to solid the extrusion of the material through the opening is possible without rigid control of temperature while at the same time a non-coherent granule is formed having sufficient mechanical strength to be handled without undue crumbling, and then cooling the resulting granules.

4. The process for the production of a granular fertilizer containing limestone and a material selected from the group consisting of ammonium nitrate and urea which comprises forming a uniformly plastic mass of a mixture of about 40 to about 50 parts of finely divided limestone to about 60 to about 50 parts of said material from the group consisting of ammonium nitrate and urea having about 20% to about 35% by volume of said plastic mass in the liquid phase, said uniformly plastic mass having a water content regulated between about 1.8% and about 10%, and then comminuting the plastic mass under relatively low pressure through a screen or grid whereby, by reason of the correlation of water content and ratio of liquid phase to solid the comminution of the material through the openings of the screen or grid is possible without rigid control of the temperature of the plastic mass being comminuted while at the same time non-coherent granules are formed having sufficient mechanical strength to be handled in a cooler or drier without undue crumbling, and then cooling the resulting granules.

FRANK J. DzREWAL.